Figure 1:
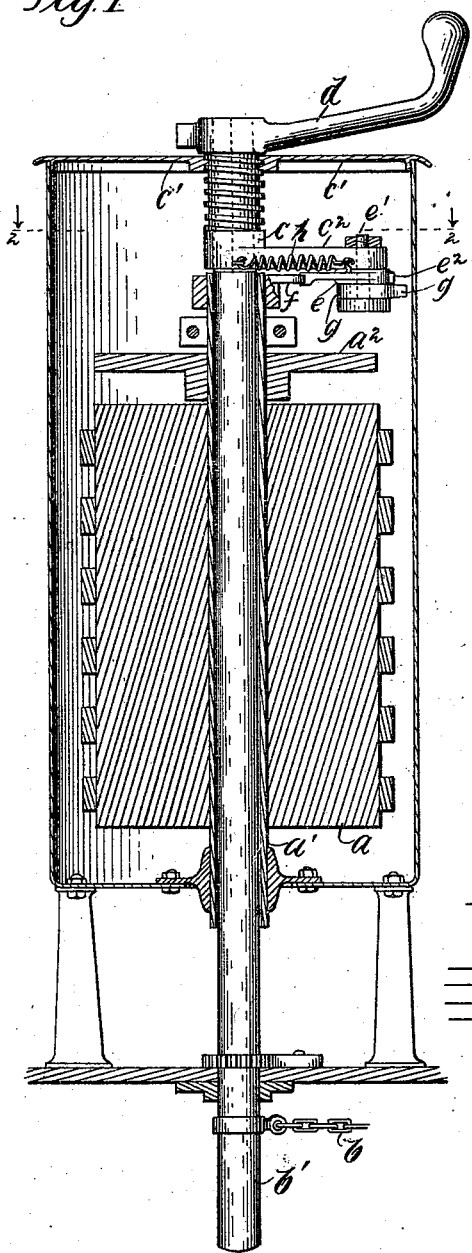

(No Model.)

J. R. CRAVATH.
COMBINED ELECTRICAL AND MECHANICAL BRAKE.

No. 547,847.  Patented Oct. 15, 1895.

Witnesses:
George L. Cragg
W. Clyde Jones

Inventor:
James R. Cravath
By Barton & Brown
Attorneys.

UNITED STATES PATENT OFFICE.

JAMES R. CRAVATH, OF CHICAGO, ILLINOIS.

COMBINED ELECTRICAL AND MECHANICAL BRAKE.

SPECIFICATION forming part of Letters Patent No. 547,847, dated October 15, 1895.

Application filed August 10, 1895. Serial No. 558,839. (No model.)

*To all whom it may concern:*

Be it known that I, JAMES R. CRAVATH, a citizen of the United States, residing at Chicago, in the county of Cook and State of Illinois, have invented a certain new and useful Improvement in a Combined Electrical and Mechanical Brake, (Case No. 1,) of which the following is a full, clear, concise, and exact description, reference being had to the accompanying drawings, forming a part of this specification.

My invention relates to a combined electrical and mechanical brake for vehicles, my object being to associate an electrical brake and a manual or mechanical brake, so that the same movement of the operating-lever or a continuation of the same movement that throws into operation the electrical brake will also throw into operation the manual brake, whereby the car may be more readily brought to a standstill and maintained at rest upon a grade.

In electrical brakes in which the current is furnished by the motors which propel the car it has been the custom to provide a controller or switch for disconnecting the motor upon the car from the trolley-conductor and for connecting the motor in a closed circuit, whereby the motor acts as a dynamo to generate a current which operates either through the reaction of the armature upon its pole-pieces or through an electromagnetic brake to bring the car to rest. The current thus produced depends upon the rotation of the motor-armature, and when the car is brought to rest the current is zero, and in consequence the brake cannot be applied when the car is at rest. Furthermore, a car equipped with an electrical brake alone cannot be brought to rest upon an incline, because as soon as the car is brought nearly to rest the flow of current falls almost to zero and the electrical brake is thrown out of operation. It has been the practice to provide in addition to the electrical brake a mechanical brake operated by a manual lever, which may be thrown into operation after the electrical brake has been operated, to thus maintain the car at rest when upon an incline; but in the construction as heretofore employed the electrical and the mechanical brakes have been operated by separate manual levers. The operation of so many handles by the motorman is undesirable, requiring great skill on the part of the operator and involving considerable loss of time in throwing on and off the brakes.

According to my invention I control the electrical brake and the mechanical brake by means of a single operating-lever, a releasing and locking device being provided which disconnects the controller-roller of the electrical brake from the operating-lever at a predetermined point and permits the continued rotation of the operating-lever to throw on the manual or mechanical brake. By this arrangement the manual brake may be thrown into action by the same operation or by a continuation of the same operation that throws the electrical brake into operation, and the electrical brake may be relied upon for performing the main work of retarding the car or train, while the mechanical hand-brake serves to bring the car to a final standstill and to maintain the car at rest on grades.

I will describe my invention in connection with the accompanying drawings, in which—

Figure 2:
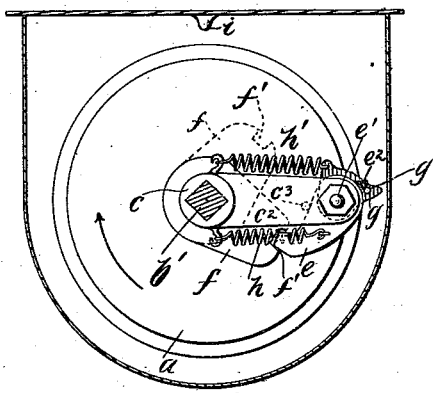
Figure 3:
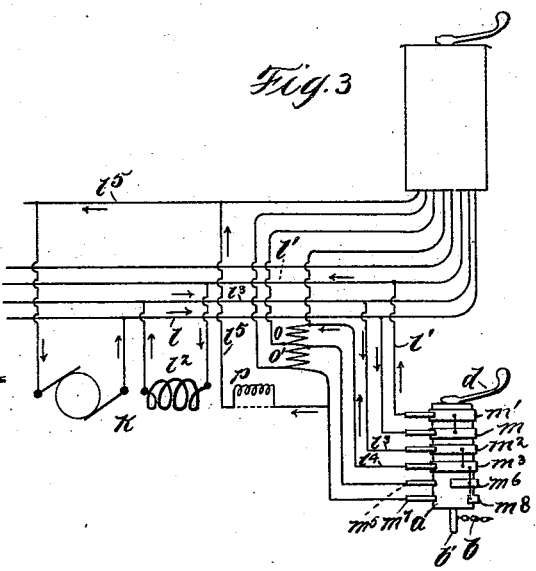

Figure 1 is a longitudinal sectional view of the mechanism for controlling the electrical and mechanical brakes. Fig. 2 is a view thereof on the line 2 2 of Fig. 1. Fig. 3 is a diagrammatic view illustrating a circuit arrangement which may be employed in practicing my invention.

Like letters refer to like parts in the several figures.

The controller-roller $a$, which controls the circuits through the electrical braking apparatus, is mounted upon a hollow shaft or sleeve $a'$, while the chain $b$, which is connected with the mechanical brake, is secured to the lower end of the shaft or brake-staff $b'$. The upper end of the brake-staff $b'$ is made of square cross-section, and over it fits a sleeve $c$, carrying a left-handed thread, adapted to engage threads provided in the cover $c'$ of the controller-box. The operating-lever $d$ fits over the squared end of the shaft $b'$, preferably removably. When the operating-lever is moved the shaft $b'$ is rotated, and with it the controller-roller $a$, the circuit through the electrical brake apparatus being controlled to throw the electrical brake into operation. At a predetermined point in the rotation of the controller-roller the roller is released from the shaft $b'$, so that further rotation of the shaft serves simply to wind up the chain $b$ to throw the mechanical brake into operation. By this arrangement the electrical brake is first thrown into operation and subsequently the mechanical brake. Upon the return of the operating-lever the mechanical brake is first thrown off, after which the controller-roller $a$ is locked to the shaft $b'$ and rotated to return the controller-roller to its original position. Upon the hollow shaft $a'$ is provided the usual notched disk $a^2$, generally employed for determining the operative positions of the controller-roller. It is especially useful in the present construction, as it prevents the roller from revolving when unlocked from the operating-lever.

Upon the sleeve $c$ is provided an arm $c^2$, which carries upon its end a dog $e$, pivoted to the arm at $e'$. Upon the hollow shaft $a'$, upon which is mounted the controller-roller, is provided an arm or plate $f$, carrying in its end a recess $f'$, with which the end of the dog is adapted to engage. Pivoted upon the arm $c^2$, at $e'$, is provided a second dog $g$, which carries a pin $g'$, adapted to engage a lug $e^2$ carried upon the dog $e$. A coiled spring $h$, connected between an eye carried upon the dog $e$ and an eye carried upon the arm $c^2$, normally maintains the dog $e$ in engagement with the recess in the end of arm $f$ or against a pin $c^3$, carried upon the arm $c^2$. A spring $h'$, connected between an eye upon the arm $c^2$ and an eye in the dog $g$, maintains the pin $g'$ normally in engagement with the lug $e^2$. When the operating-lever is at rest on zero position, the parts occupy the positions illustrated in Figs. 1 and 2. In throwing on the brake the operating-lever is moved in clockwise direction, and after moving through a predetermined distance—three-fourths of a rotation, as illustrated—the projecting end of dog $g$ engages a lug $i$, provided upon the side of the inclosing box, thus fractionally rotating the dog $g$, and through the engagement of the pin $g'$ with the lug $e^2$, rocking the dog $e$ and moving the end thereof out of engagement with the recess $f'$. The shaft $b'$, carrying the arm $c^2$, is thus disengaged from the shaft $a'$, carrying the arm $f$, and the controller-roller $a$ comes to rest with the plate $f$ occupying the position indicated in dotted lines in Fig. 2, while the brake-staff $b'$ is rotated by the further movement of the operating-lever to throw on the mechanical brake. In order that the dog $e$ may not engage the arm $f$ during succeeding rotations, the left-hand thread carried upon the sleeve $c$ is provided, which, engaging with the threads upon the cover $c$, causes the ascent of the sleeve $c$, the sleeve moving longitudinally upon the squared end of the brake-staff $b'$. The dog $e$ thus passes upon subsequent rotations over the top of arm $f$, and does not engage therewith. The dog $g$ is made separate from the dog $e$, in order that the locking mechanism may pass the lug $i$ on the backward travel when the operating-lever is rotated to throw off the brakes.

In Fig. 3 I have illustrated one of the circuit connections which may be employed in practicing my invention, but it will appear that my invention is equally applicable to other circuit arrangements. In the position of the brake-controller $a$, as illustrated, the circuit of the motor $k$, acting as a dynamo, may be traced, as indicated by the arrows, over line $l$ through contact-plates $m\ m'$ upon the controller-roller, and by conductor $l'$ through the field-coil $l^2$ of the motor, by conductor $l^3$ through the plates $m^2\ m^3$, by conductor $l^4$ through the coils $o\ o'$ of the rheostat, through the coils $p$ of the electromagnetic brake, and back to the opposite side of the motor by the conductor $l^5$. When the controller-roller is rotated to bring the brush $m^5$ in contact with the plate $m^6$, the circuit is changed to cut the resistance-coil $o$ from the circuit, and when the brush $m^7$ is brought into contact with the plate $m^8$ the resistance-coil $o'$ is cut out.

I have illustrated diagrammatically the winding $p$ of the electromagnetic brake, but instead of imploying an electromagnetic brake the motor itself may be employed to effect the braking operation, the braking effect being accomplished by the reaction of the armature upon the pole-pieces. Instead of employing the driving-motor for furnishing the braking-current, a second dynamo-electric machine may be provided upon the car and employed for braking purposes only.

In systems where electrical brakes are not employed I am aware that it has been proposed heretofore to operate the controller-roller which controls the trolley-circuit through the motor by the same operating-lever that throws on and off the mechanical brake; but I believe it to be new to combine an electrical and a mechanical brake whereby they may be operated by the same lever and by the same movement, or a continuation of the same movement, to first throw on the electrical brake to perform the main work of retarding the vehicle, while subsequently the mechanical brake may be thrown on to bring the car to a final standstill or to maintain the car at rest on grades.

Having described my invention, what I claim as new, and desire to secure by Letters Patent, is—

1. In a combined electrical and mechanical brake, the combination with an electrical brake, operated by a motor or motors rotated by the motion of the vehicle, of a mechanical brake, and a single operating lever or handle for first throwing the electrical brake into operation to perform the main work of retarding the car and subsequently throwing the mechanical brake into operation to bring the car to a final standstill and hold the car on grades; substantially as described.

2. In a combined electrical and mechanical brake, the combination with an electrical brake, operated by a motor or motors rotated by the motion of the vehicle, of a mechanical brake, a single operating lever or handle, a controller roller for controlling the circuits through the electrical brake, and locking and releasing mechanism for disconnecting the controller roller from the operating lever at a predetermined point in the rotation to permit the continued movement of the operating lever to throw on the mechanical brake; substantially as described.

3. In a combined electrical and mechanical brake, the combination with the brake staff and the hollow shaft carrying the controller roller, of the sleeve $c$ longitudinally movable upon the brake staff and carrying the screw threads for raising the sleeve, and the arm $c^2$, the dogs $e$ and $g$ mounted upon the arm $c^2$, the lug $i$ adapted to be engaged by the dog $g$, and the arm $f$ carried upon the hollow shaft and provided with a recess adapted to be engaged by dog $e$; substantially as described.

In witness whereof I hereunto subscribe my name this 7th day of August, A. D. 1895.

JAMES R. CRAVATH.

Witnesses:
JOHN W. SINCLAIR,
W. CLYDE JONES.